United States Patent [19]

Travers et al.

[11] Patent Number: 5,251,217
[45] Date of Patent: Oct. 5, 1993

[54] TIME-DIVISION MULTIPLEX INFORMATION TRANSMISSION SYSTEM HAVING A VARIABLE STRUCTURE

[75] Inventors: Jean-François Travers, Lannion; Jacques Briand, Minihy-Treguier; Yvon Guedes, Lannion, all of France

[73] Assignee: U.S. Philips Corporation, New York, N.Y.

[21] Appl. No.: 772,811

[22] Filed: Oct. 4, 1991

[30] Foreign Application Priority Data

Oct. 9, 1990 [FR] France ............... 90 12415

[51] Int. Cl.$^5$ .............................................. H04J 3/22
[52] U.S. Cl. ...................... 370/112; 370/79; 370/84; 370/94.1
[58] Field of Search ............ 370/79, 112, 94.1, 95.3, 370/84

[56] References Cited

U.S. PATENT DOCUMENTS

| | | |
|---|---|---|
| 3,213,201 | 10/1965 | Flood et al. |
| 4,312,070 | 1/1982 | Coombes et al. ............... 375/108 X |
| 4,713,804 | 11/1987 | Servel et al. ............... 370/68 |
| 5,062,105 | 10/1991 | McKnight et al. ............... 370/84 |

FOREIGN PATENT DOCUMENTS

| | | |
|---|---|---|
| 0261127 | 12/1989 | European Pat. Off. |
| 2497041 | 6/1982 | France |
| 2509553 | 1/1983 | France |

Primary Examiner—Douglas W. Olms
Assistant Examiner—Russell W. Blum
Attorney, Agent, or Firm—David R. Treacy

[57] ABSTRACT

A telecommunications system for information having a variable structure. The system uses at least one frequency channel for transmitting each second $N_T$ transmission packets to subscriber arrangements. These packets are formed by $n_t$ bits and are allocated to subscriber arrangements themselves producing $1/T_s$ information packets of $n_s$ bits per second. The system includes a time-division multiplex circuit (10) for multiplexing the information signals coming from subscriber arrangements (SPA1, CIA2, ..., SPAm ...) and, alternatively, a demultiplex circuit (28) for distributing the time-division multiplex information signals to subscriber arrangements. Interleaving circuits are coupled to the multiplex circuit for inserting, into an allocated transmission packet, bits of different information packets allocated to the same subscriber arrangement. De-interleaving circuits coupled to the demultiplex circuit perform the reverse operation.

6 Claims, 8 Drawing Sheets

TIME-DIVISION MULTIPLEX INFORMATION TRANSMISSION SYSTEM HAVING A VARIABLE STRUCTURE

CROSS-REFERENCE TO RELATED APPLICATION

This application is related to subject matter disclosed in a patent application filed concurrently by applicants for "Transmission System Comprising a Plurality of Subscriber Arrangement".

FIELD OF THE INVENTION

The present invention relates to a time-division multiplex information transmission system presenting a variable structure using at least one frequency channel for transmitting per second $N_T$ transmission packets to subscriber arrangements, which packets are constituted by $n_t$ bits and allocated to subscriber arrangements themselves producing $1/T_S$ information packets of $n_s$ bits per second, which system comprises at least a time-division multiplex circuit for multiplexing the information signals coming from the subscriber arrangements and for forming said time-division multiplex and, alternatively, a demultiplex circuit for distributing the time-division multiplex information to the subscriber arrangements.

BACKGROUND OF THE INVENTION

Such a system is described in European Patent Application EP-A 0 261 127. This prior-art system permits transmitting information packets in different formats. It is thus possible for the formats to be matched with the different information packet formats of the speech coders/decoders which are actually found on the market.

SUMMARY OF THE INVENTION

The invention proposes a system of this type which also presents the possibility to match the formats to the rate of the different speech coders/decoders and which also permits transmitting data at variable rates in a same frame without the need for much circuitry.

Therefore, such a system is characterized in that interleaving means are provided coupled to the multiplex circuit for inserting bits of different information packets allocated to the same subscriber arrangement into an allocated transmission packed and de-interleaving means coupled to the demultiplex circuit for performing the reverse operation of the interleaving means.

An important advantage of the invention is that an error packet occurring in a transmission packet is exposed because of interleaving in various information packets as they are coded by error correcting codes, the information signals may thus be restored more easily because the errors are exposed, that is, uncorrelated. The error correcting coding of each packet is thus performing better.

BRIEF DESCRIPTION OF THE DRAWINGS

The following description accompanied by annexed drawings, all given by way of non-limiting example, will make it better understood how the invention can be realised, in which.

DESCRIPTION OF PREFERRED EMBODIMENTS

Figure 1:
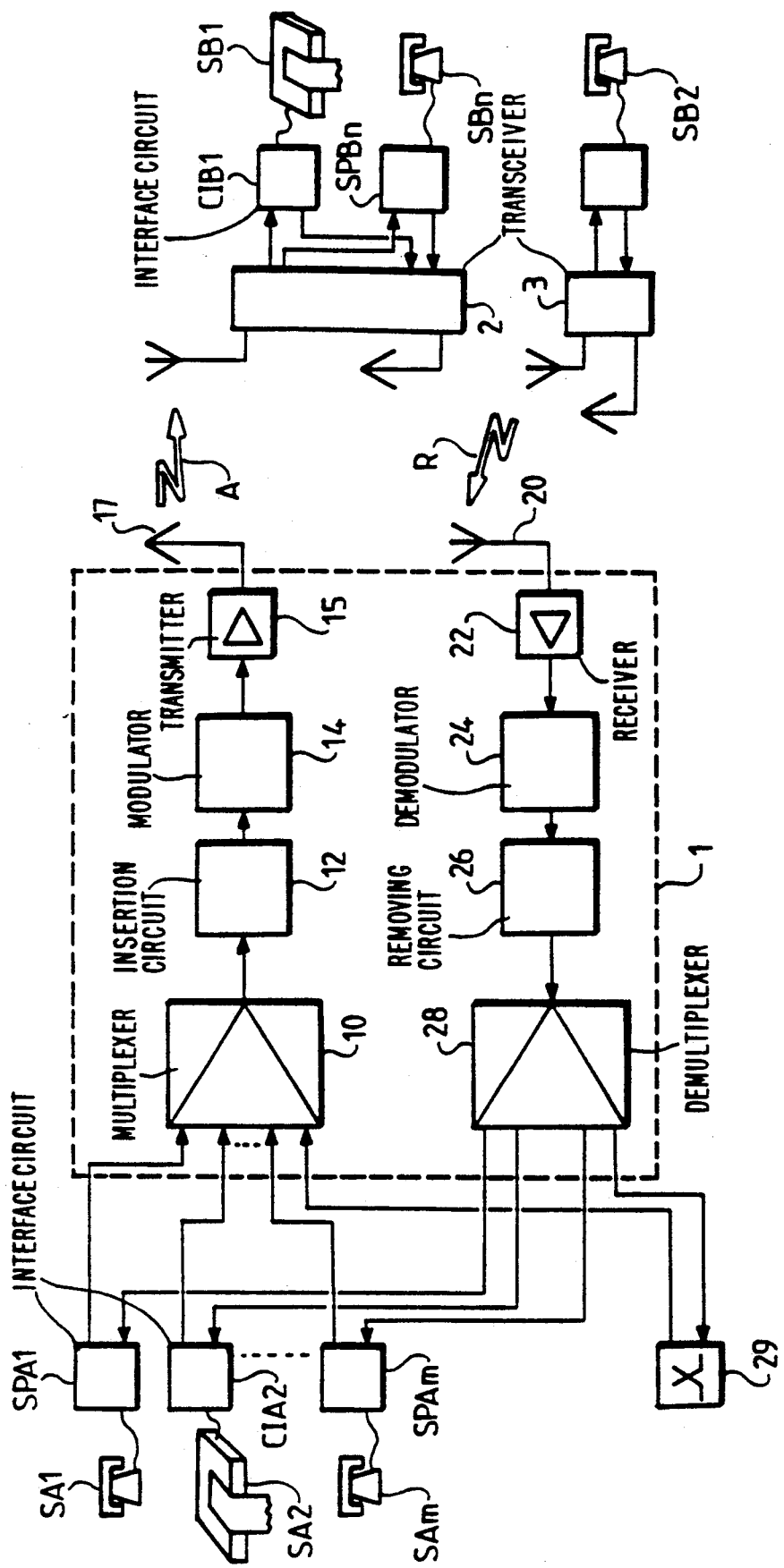
FIG. 1 shows an information transmission system according to the invention.

FIG. 1 shows a transmission system according to the invention. For simplicity three transceiver arrangements are shown referenced 1, 2 and 3 whereas, in practice, a plurality of such arrangements may form part of such a system. The arrangements 2 and 3 are considered portable stations in this example, whereas the arrangement 1 is considered a fixed or base station. These three arrangements communicate among themselves over a bidirectional link, for example, a radio link which connects the arrangement 1 to the arrangement 2 and the arrangement 1 to arrangement 3 in a direction indicated by the arrow A and, on the other hand, the arrangement 2 to the arrangement 1 and the arrangement 3 to the arrangement 1 in the direction shown by arrow R.

To each of these arrangements are connected a certain number of subscriber units SA1, SA2, . . . , SAm for the arrangement 1 and SB1, SB3, (not shown). . . , SBn for the arrangement 2 and SB2 for the arrangement 3. These subscriber units may be telephone sets in the case of the units SA1, SAm, SB2 and SBn and they are connected to the arrangements 1 to 3 by means of speech coders/decoders SPA1, SPAm, SPB2 and SPBn respectively, or also facsimile communication arrangements, etc., SA2, SB2 connected to the arrangements 1 and 2 through interface circuits CIA2 and CIB2. But, whatever the subscriber unit, the data presented at their outputs are of the binary type so that the transmission between the arrangements 1 to 3 can be performed in a digital time-division multiplex mode of the TDMA type, each of the arrangements comprising means for incorporating or obtaining the multiplex information signals.

This multiplexing is realised by the multiplex circuit 10 forming part of the arrangement 1, which multiplexes the information signals coming from the coders/decoders of the interface circuit SPA1, CIA2, . . . , SPAm. By means of an insertion circuit 12 bits for managing the packet and the multiplex mode are added to the multiplexed data. Subsequently, the bits produced by the circuit 12 are used by a modulator 14 which sends out a symbol for two bits (a case of modulation of two bits per symbol). A transmitter 15 transmits these symbols into space by means of a transmitter aerial 17 in the direction of the arrangement 2 in the direction A.

The information signals coming from the arrangement 2 being propagated in the direction R are captured by the receiver aerial 20. A receive circuit 22 connected to this aerial supplies signals to a demodulator 24. The bits restored by this demodulator are processed by a removing circuit 26 which removes the management bits. A demultiplexer 28 distributes the information signals over the different decoders and interface circuits SPA1, CIA2, . . . , SPAm. For being transmitted over a radio channel, the TDMA multiplex mode requires frequency channels centred around a carrier frequency.

In addition, there is provided for the arrangement 1, a change-over switch of the PABX type 29 which permits establishing the communications between the mobile stations, in this case the arrangements 2 and 3.

Figure 2:
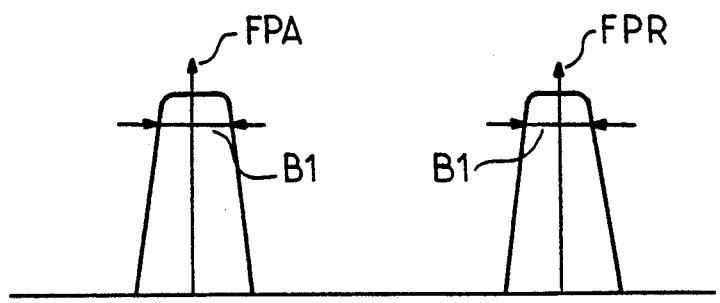
FIG. 2 shows frequency spectrums utilized by the TDMA multiplex.

FIG. 2 shows frequency channels centred around two carrier frequencies FPA and FPR, each being assigned to a transmit direction A and R respectively. The passband BP envisaged hereinbefore around these carrier frequencies is 25 kHz. The carrier frequencies are included in the band from about 400 MHz to 900 MHz.

Figure 3:
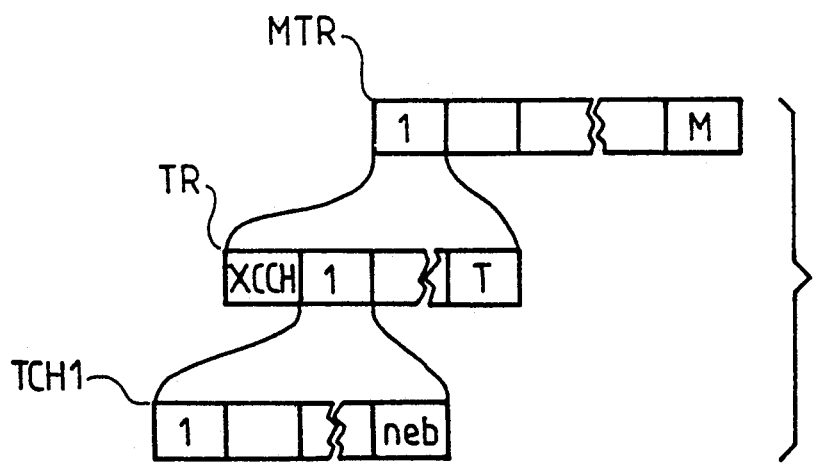
FIG. 3 shows the organisation of the TDMA multiplex.

FIG. 3 shows the organisation of this TDMA multiplex, constituted by a multi-frame MTR formed by M frames TR, each formed by T time intervals TCHi ($i=1, \ldots, T$) and also a time interval XCCH. The interval XCCH is used for the organisation of a multiplex, whereas the intervals TCHi are there for transmitting the useful traffic. Each of these intervals TCH$_1$ to TCH$_T$ comprises $n_{eb}$ bits.

For a time-division multiplex mode in which between 1 and 6 channels are transported one has:

M=60 frames per multi-frame,

T=19 time intervals TCH per frame, that is to say, a total of 20 time intervals including the interval XCCH, $n_{eb}$=190 bits, 46 of which are used for recovering 144 traffic bits and for communication management (synchronization, state of the subscriber, on-hook or off-hook ...).

Within the framework of the described example, with 200 useful traffic time intervals transmitted in one second, the array of traffic channels has a rate of 28.8 kbit/s.

Figure 4:
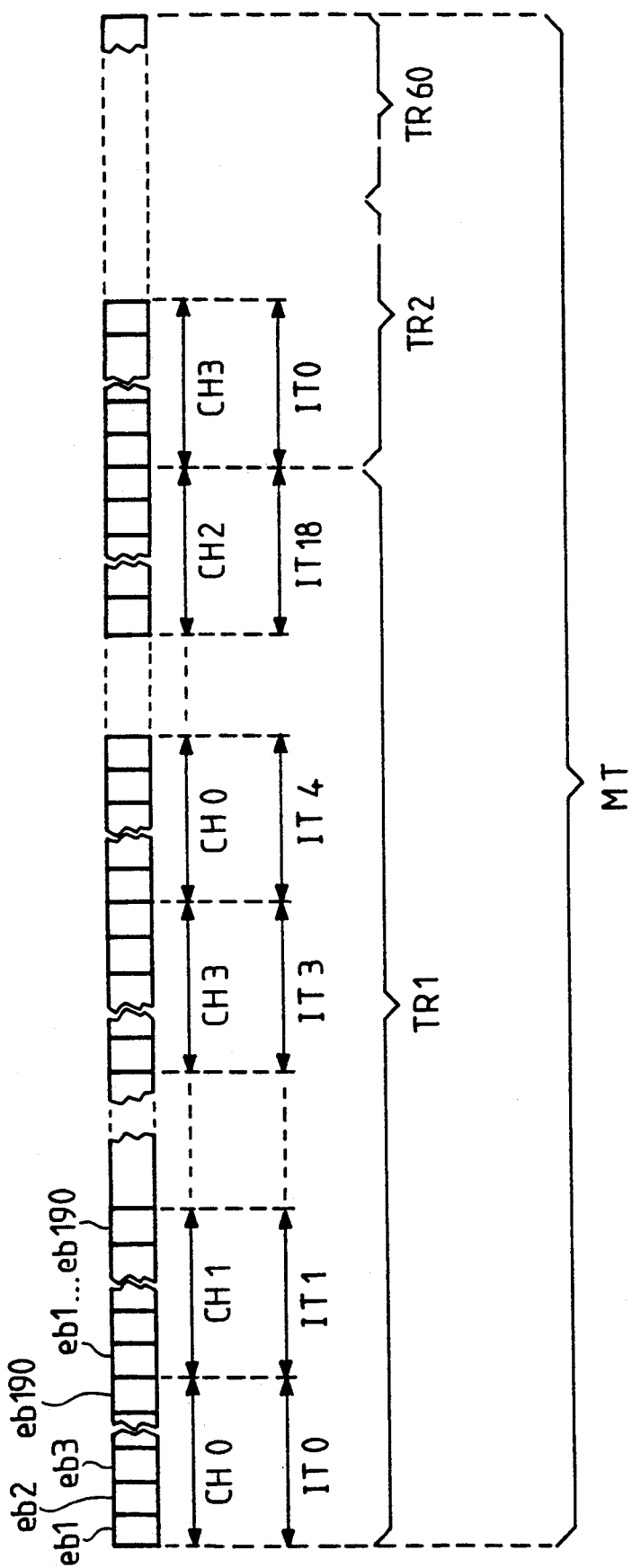
FIG. 4 shows the distribution of the channels used for transmitting transmission packets.

Because the time-division multiplex is to be adapted to different speech coders (2.4 kbit/s, ..., 13 kbit/s) it is necessary to present between 1 and 6 traffic channels. FIG. 4 shows the organisation of this multiplex mode for a number of channels equal to 4.

The four channels CH0 to CH3 correspond each to a subscriber arrangement and are used for transmitting a packet of $n_{eb}$ bits, 144 of which are available to the user. The frame TR1 is constituted by 19 time intervals IT0 to IT18 and one multi-frame comprises 60 frames.

In one frame the time intervals

IT0, IT4, ..., are allocated to channel CH0,
IT1, IT5, ..., are allocated to channel CH1,
IT3, ..., IT15, are allocated to channel CH3.

Figure 5:
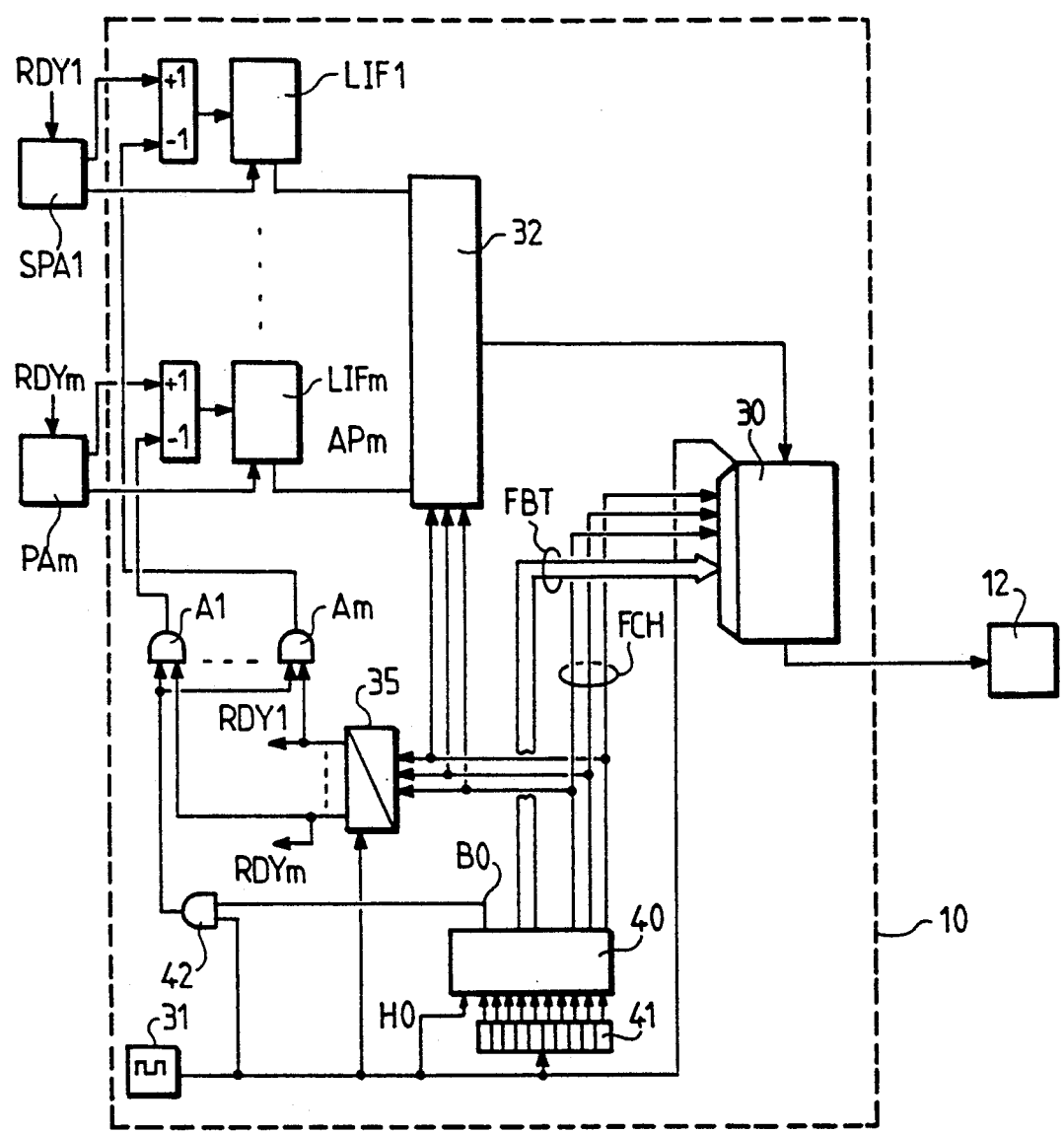
FIG. 5 gives a detailed diagram of the multiplex circuit.

The multiplex circuit 10 shown in detail in FIG. 5 is built around a memory 30 into which the word packets processed by the speech coders SPA1, ..., SPAm are written. This memory is alternately set in the write and read modes by means of a periodic signal HO formed by a clock 31. The word packets pass through stack memories LIF1 to LIFm which store the bits one by one and restore them one by one. The outputs of these memories LIF1 to LIFm are connected to the data input of memory 30 over a multiplexer 32. The output of the memory 30 is connected to the circuit 12.

This memory is addressed by means of two sets of wires FCH and FBT. The wires FCH transmit a code relating to the channel and thus refer to the information signals coming from the coders. These wires are thus used during the writing of the memory 30 for selecting these different coders. Therefore, a decoder 35 is used which, in response to the code transmitted by the set of wires FCH, activates one of the m wires of its output which transmit the respective signals RDY1, ..., RDYm. These signals are applied to the decoders SPA1 to SPAm for initiating the next conversion and also applied to a series of AND gates A1 to Am.

The output signals of these gates influence the address pointer of the stack memories LIF1 to LIFm to empty these memories when they are active. To fill these memories, signals coming directly from the coders SPA1 to SPAm ... are produced at the address pointer.

For addressing the memory 30, an addressing circuit 40 is used, whose outputs are connected to the above-mentioned sets of wires FCH and FBT, and whose one output BO is connected to a gate 42 inserted between the clock output 31 and one of the inputs of the gates A1 to Am. This signal at the output BO permits blocking the emptying of the stack memories LIF1 to LIFm by inhibiting the gate assigned to the down-counting of the address pointer of the stack memory concerned.

This memory is addressed by a counter 41 counting the clock pulses 31.

The invention proposes to adapt this multiplex to different needs of the subscribers.

I—DATA TRANSMISSION

If each data bit is coded at a coding rate of $\frac{1}{2}$ (that is to say, the bits to be transmitted are extended by other bits to use an error detecting and/or correcting code).

The following formula presents the possible channel distributions:

$$(l \times 9600)+(k \times 4800)+(j \times 2400)+(i \times 1200) \leq 14.400 \text{ bit/s,}$$

where

L is the number of communication channels at 9600 bit/s k is the number of communication channels at 4800 bit/s j is the number of communication channels at 2400 bit/s i is the number of communication channels at 1200 bit/s.

II—SPEECH TRANSMISSION CODED IN DIGITAL FORM

II-1 Consideration for the coders

Various speech coders/decoders for speech transmission are available on the market. The Table I hereinbelow gives the characteristics of several of them, referenced A to K. These coders produce information bit packets: for example 48 for the coder/decoder A every 20 ms, which represents a rate of 2.4 kbit/s. By way of illustration the type G corresponds to a MATRA design, the type J to a MOTOROLA design.

TABLE I

| Coder | Rate kbit/s | Mean Time ms | Packet lenght |
|---|---|---|---|
| A | 2,4 | 20 | 48 |
| B | 2,4 | 25 | 60 |
| C | 2,4 | 30 | 72 |
| D | 4,8 | 20 | 96 |
| E | 4,8 | 25 | 120 |
| F | 4,8 | 30 | 144 |
| G | 6 | 20 | 120 |
| H | 6,7 | 20 | 134 |
| I | 7,2 | 20 | 144 |
| J | 8 | 20 | 160 |
| K | 13 | 20 | 260 |

It is interesting to note that within the framework of our described example it is possible to obtain the following links, shown in the Table II, in which DU denotes a duplex link and H.DU a half-duplex link.

TABLE II

| Coder | K | H,I,J | D,E,F | A,B,C |
|---|---|---|---|---|
| Nb LINK | { 1DU<br>2H.DU | 1DU + 1H.DU<br>3H.DU | 2DU<br>4H.DU | 3DU<br>6H.DU |

The adaptation to the different multiplex coders both as regards the rate and the packet structure is realised with the combination of the frame structure which realises the adaptation in terms of rates and with the interleaving which realises the adaptation in terms of packet structure.

The addressing of the memory 30 which realises the adaptation described hereinbefore is realised around the FCH and FBT whose characteristic features are determined by the number of channels and the interleaving diagram.

II—2 Considerations for the concept of the addressing circuit

1) Determination of the number of channels

The maximum number of channels is fixed at 6 in the described example, which corresponds to 3 wires for the set FCH. The number C of these channels to be used is given by the formula:

$$C = INT(DU/Df)$$

Where

INT( ) = integer part of the quantity placed in brackets,

DU = 28.8 bit/s useful bit rate transmitted in multiplex,

Df = useful rate of the speech coder with error correcting code.

2) Determination of the interleaving factors

The interleaving factors to be determined are m1 and m2. They are to satisfy the following relation:

$$(Df.Ts) \times m2/m1 \leq Du/N_T$$

Where

Df.TS represents the number of bits of the packet produced by the coder, $N_T$ is the number of time intervals per second, in this described example $N_T = 200$, that is to say, $Du/N_T = 144$.

Table III given hereinbelow presents the interleaving factors for different coders that can be contemplated.

N defines the profoundness of the interleaving: the larger N the more error packets are EXPOSED more effective are the error correcting codes.

Different types of interleaving may be contemplated.

III—INTERLEAVING

III—1 Packet Interleaving

Figure 6:
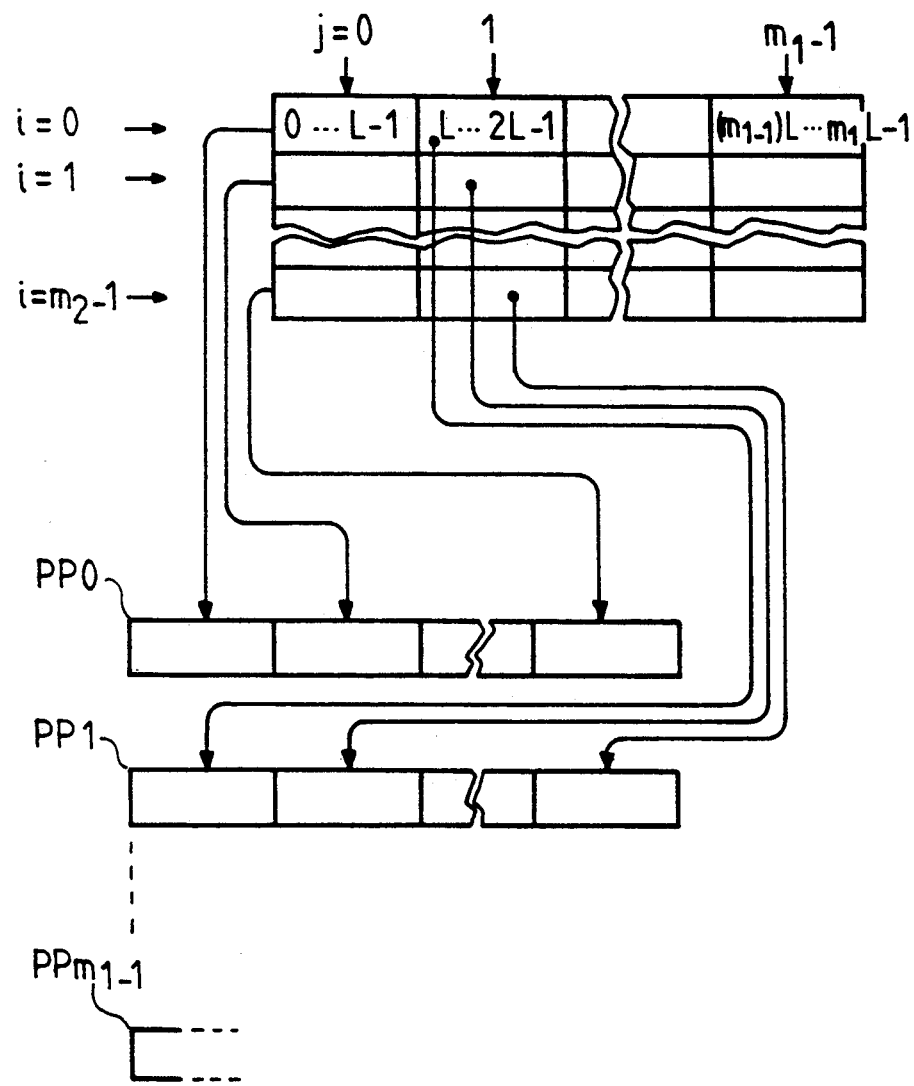
FIG. 6 shows how the packets are interleaved.

The principle may be explained with the aid of FIG. 6 which represents a Table whose different lines denoted $i = 0$ to $m_2 - 1$ contain $m_2$ successive information bit packets produced by a coder. Each of these packets is partitioned into $m_1$ sub-packets as is represented in FIG. 5 by the references $j = 0, 1, 2, \ldots, m_1 - 1$. Each of these $m_1$ sub-packets is formed by L bits.

The resulting of the interleaving is a series of PPO to PPm$_1 - 1$ packets of $m_2 \times L$ bits formed by sub-packets read out in columns.

Thus, the packet PPO will be formed by L first bits of the $m_2$ information packets, the packet PP1 of the bits L to $2L - 1$ of the $m_2$ information packets.

The number of bits of the sub-packets is to be lower than or equal to the number of bits of the transmission packets. Consequently, in case of inferiority of the bits, stuff bits are inserted into the transmission packets, because the signal B0 inhibits gate 42.

III—2 Bit-packet interleaving

Figure 7:
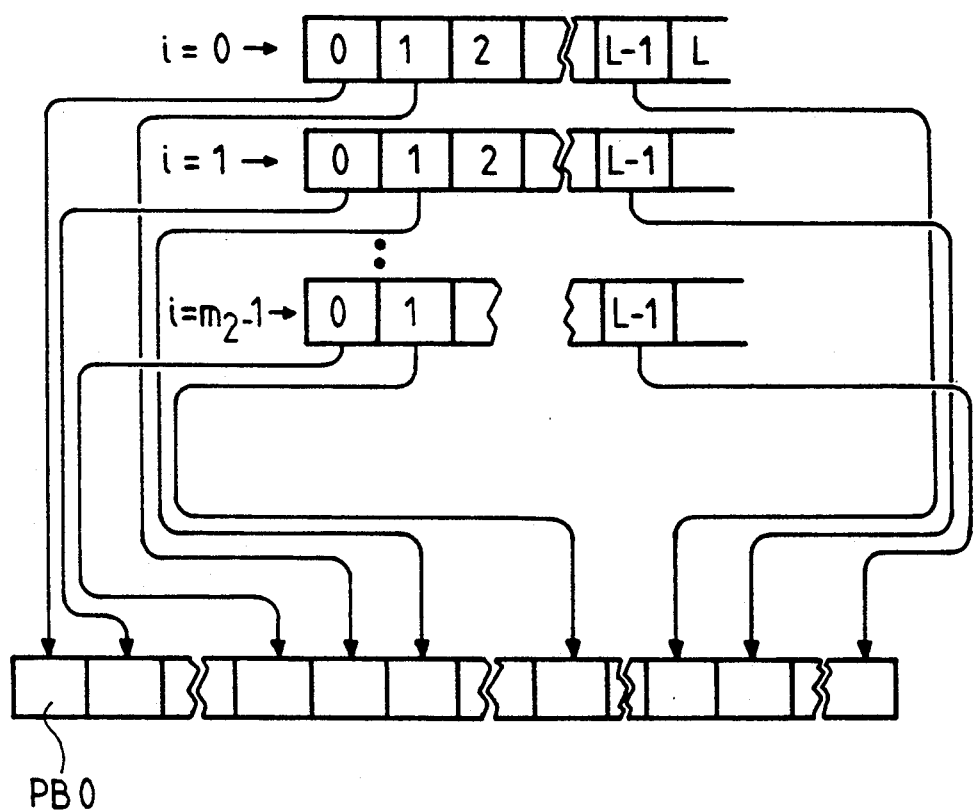
FIG. 7 shows how the bits are interleaved per packet.

This is explained with the aid of FIG. 7. As for the packet interleaving, a Table is shown in which the different lines denoted $i = 0$ to $m_2 - 1$ represent the $m_2$ information packets, partitioned each into $m_1$ sub-packets of L bits.

The result of this interleaving is a series of packets PB0 to PBm$_1 - 1$. Only the packet PB0 is represented in this Figure. This packet is formed by first bits taken successively in the packets $i = 0$, $i = 1$, $i = m_2 - 1$, then the second bits and so on and so forth for all the bits of the sub-packet. The second packet PB1 will be continued in the same manner for the L bits following the $L - 1$th bit.

The addressing Table may be simply devised as a function of the following considerations.

Two phases are to be considered: a write phase and a read phase of the memory.

IV—CONCEPT OF THE ADDRESSING TABLE

Figure 8:
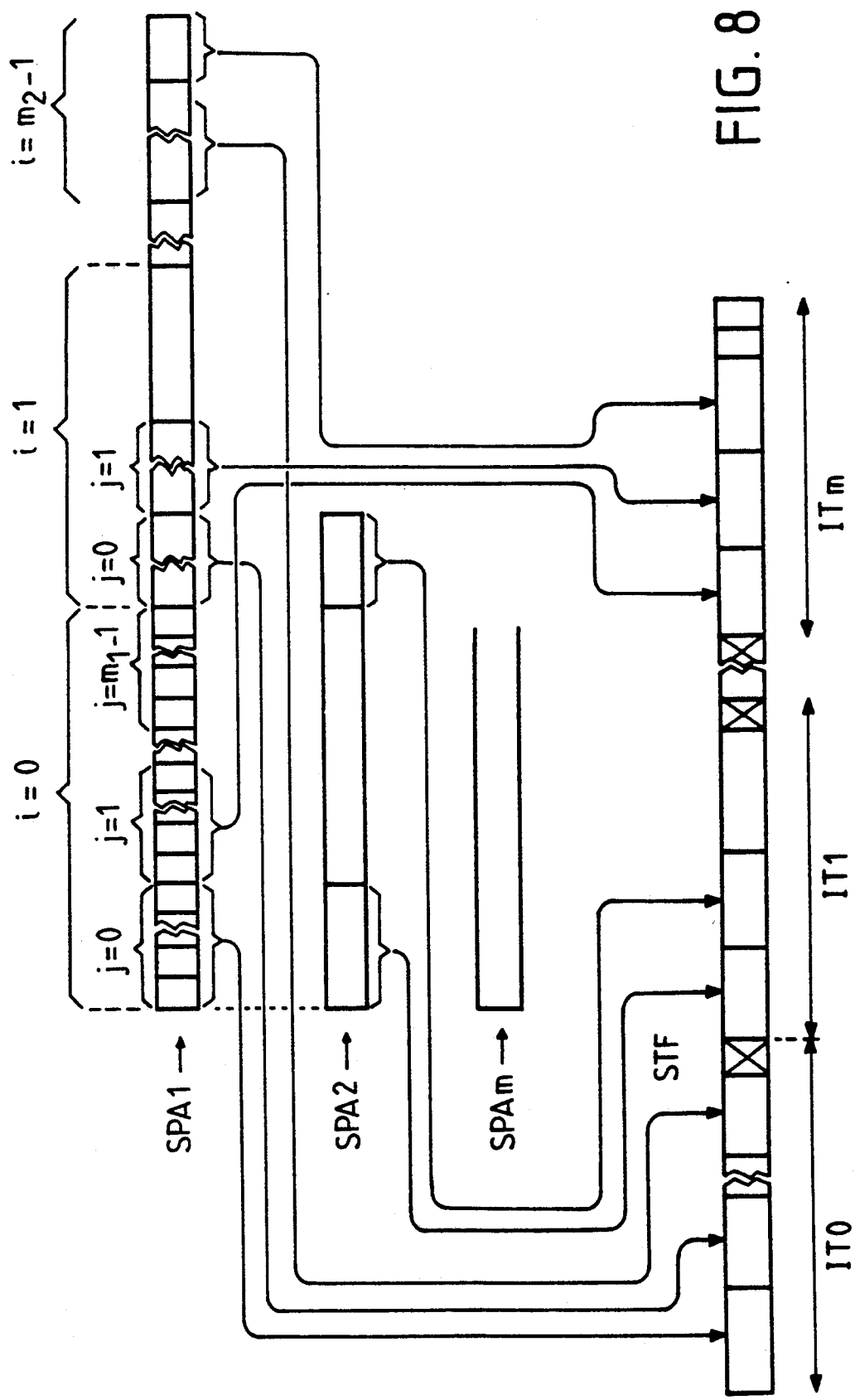
FIG. 8 shows how the address circuit for packet interleaving is arranged.

IV—1 Packet Interleaving (cf. FIG. 8)

a) Write phase

Each information packet is written bit by bit in the memory for each of the coders in operation.

Thus, with reference to FIG. 8, the writing operation is performed in the following manner:

for $i = 0$ each packet coming from SPA1 to SPAn is written, subsequently

TABLE III

| Number of time intervals/second assigned to each channel | 2 | 3 | 4 | 5 | 6 |
|---|---|---|---|---|---|
| | 100 | 66,6 | 50 | 40 | 33,33 |
| interleaving for coder (m1, m2) | | | | | |
| A,D,G,H,I,J,K (20 MS) | (2N,N) | (4N,3N) | (N,N) | (4N,5N) | (2N,3N) |
| B,E (25 MS) | (5N,2N) | (5N,3N) | (5N,4N) | (N,N) | (5N,6N) |
| C,F (30 ms) | (3N,N) | (2N,N) | (3N,2N) | (6N,5N) | (N,N) | for i=1 a start is made again, and so on . . .

b) Read phase

This read phase consists of filling the transmission packets while the memory 30 is being read. The time slot IT0 will successively be filled with sub-packets j=0, packets i=0, i=1 and i=$m_2$−1, all coming from the coder SPA1 and may be filled, as required, by stuff bits STF. Then, the same operation will be effected for each coder SPA2 to SPAm. Then, for the time slot ITm the sub-packets j=1 of the packets i=0 to i=$m_2$−1 will be inserted and so on . . .

Figure 9:
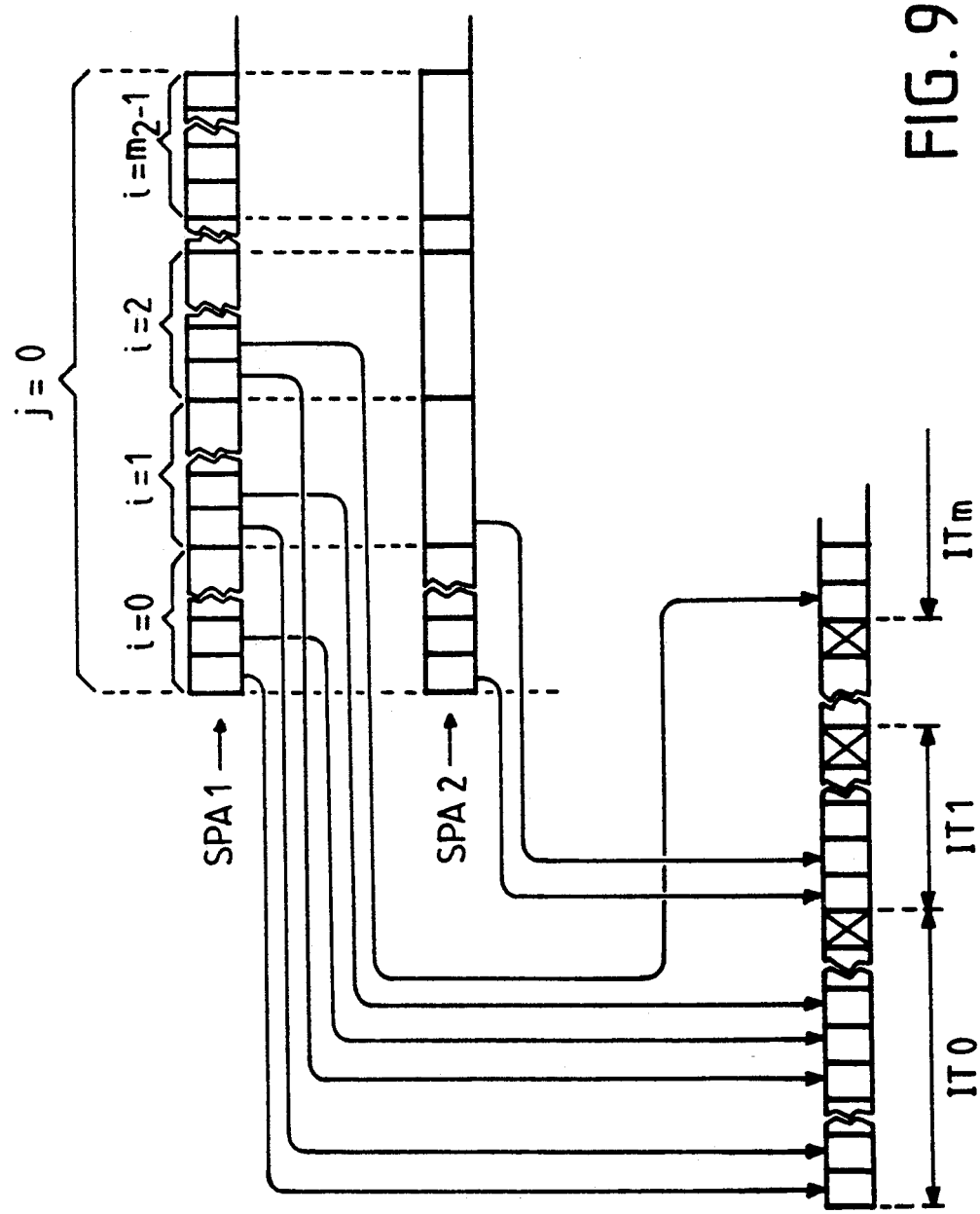
FIG. 9 shows how the address circuit for interleaving bits in packets is arranged.

IV—2 Bit-packet Interleaving (cf. FIG. 9)

a) Write phase

This is identical with the phase described hereinbefore.

b) Read phase

All the first bits of the $m_2$ packets (i=0, . . . , $m_2$−1) are put in the time slot IT0, then the second bits. Thus, in FIG. 8, all the first bits are put in the time slot IT0, then the second bit of the sub-packet (i=0, . . . , $m_2$−1) and this holds for all the coders SPA1 to SPAm.

Subsequently, at the frame ITm which is attributed to the bits of the coder SPA1, one continues with the second bit of the sub-packet j=1 and so on . . .

V—DE-INTERLEAVING

This is the reverse operation of the interleaving operation and any expert will be capable of devising the de-interleaving as a function of that which has been observed for the interleaving.

We claim:

1. A time-division multiplex information transmission system capable of transmitting information packets having differing data rates and packet structures, for transmitting information packets from selected ones of a first plurality of subscriber units to corresponding selected ones of a second plurality of subscriber units via a communications arrangement, said corresponding selected ones including units having a first coder data rate and packet structure, and units having a second coder data rate and packet structure independent of said first coder data rate and packet structure, and each of said selected one having respectively the same coder data rate and packet structure as said corresponding selected one,
characterized in that said communications arrangement comprises a time division multiplex circuit for multiplexing information signals and forming transmission packets for transmission as part of a multiframe including a plurality of frames, each frame including a plurality of equal duration time intervals forming a selected plurality of channels, each channel corresponding to a respective selected one of said first plurality of subscriber units, and
said multiplex circuit includes interleaving means for transforming $m_2$ different information packets constituted by $m_1$ sub-packets of information signals having said first code data rate, to be transmitted to a first subscriber unit, into $m_1$ transmission packets constituted by $m_2$ sub-packets of different information signals, inserting the first of said $m_1$ transmission packets into a first time interval which is part of one channel, and inserting at least one other of said $m_1$ transmission packets into at least a second time interval forming part of said one channel; and for inserting bits of other different information packets having said second coder data rate independent of said first coder data rate, to be transmitted to a second subscriber unit, into a third time interval which is part of another channel, said third time interval lying between said first and second time intervals,
whereby said equal duration time intervals in a given frame, with interleaved bits from different information packets, include bits from information packets independent of the sameness or difference of the respective code—data rates of said different information packets.

2. A system as claimed in claim 1, characterized in that said second coder data rate is different from said first coder data rate, and
said multiplex circuit includes means for inserting one number of stuff bits into said second time interval, and a different number of stuff bits into said third time interval.

3. A time-division multiplex information transmission system capable of transmitting information packets having differing data rates and packet structures, for transmitting information packets from selected ones of a first plurality of subscriber units to corresponding selected ones of a second plurality of subscriber units via a communications arrangement, said corresponding selected ones including units having a first coder data rate and packet structure, and units having a second coder data rate and packet structure independent of said first coder data rate and packet structure, and each said selected one having respectively the same coder data rate and packet structure as said corresponding selected one,
characterized in that said communications arrangement comprises a time division multiplex circuit for multiplexing information signals and forming transmission packets for transmission as part of a multiframe including a plurality of frames, each frame including a plurality of equal duration time intervals forming a selected plurality of channels, each channel corresponding to a respective selected one of said first plurality of subscriber units,
said multiplex circuit includes interleaving means for inserting bits of different information packets having said first data coder rate, to be transmitted to a first subscriber unit, into a first time interval which is part of one channel, other bits of said different information packets being inserted into at least a second time interval forming part of said one channel; and for inserting bits of other different information packets having said second coder data rate independent of said first coder data rate, to be transmitted to a second subscriber unit, into a third time interval which is part of another channel, said third time interval lying between said first and second time intervals, and
said interleaving means transforms $m_2$ different information packets constituted by $m_1$ sub-packets of said information signals having said first coder data rate into $m_1$ transmission packets constituted by bits of each successive sub-packet of information signals, two successive bits of a same information packet being interspaced by $m_2$ bits in the transmission packets,
whereby said equal duration time intervals in a given frame, with interleaved bits from different information packets, include bits from information packets independent of the sameness or difference of the respective coder data rates of said different information packets.

4. A system as claimed in claim 3, characterized in that said second coder data rate is different from said first coder data rate, and said multiplex circuit includes means for inserting one number of stuff bits into said second time interval, and a different number of stuff bits into said third time interval.

5. A time-division multiplex information transmission system for data having a variable structure, for transmitting information packets from selected ones of a first plurality of subscriber units to corresponding selected ones of a second plurality of subscriber units via a communications arrangement, said corresponding selected ones including units having mutually different coder data rates and packet structures, and each said selected one having respectively the same coder data rate and packet structure as said corresponding selected one, characterized in that said communications arrangement comprises a time division multiplex circuit for multiplexing information signals and forming transmission packets for transmission as part of a multiframe including a plurality of frames, each frame including a plurality of equal duration time intervals forming a selected plurality of channels, each channel corresponding to a respective selected one of said first plurality of subscriber units, and said multiplex circuit includes interleaving means for transforming $m_2$ different information packets constituted by $m_1$ sub-packets of information signals having a first coder data rate, to be transmitted to a first subscriber unit, into $m_1$ transmission packets constituted by $m_2$ sub-packets of different information signals, inserting the first of said $m_1$ transmission packets into a first time interval which is part of one channel, and inserting at least one other of said $m_1$ transmission packets into at least a second time interval forming part of said one channel; and for inserting bits of other different information packets having a second coder data rate different from said first coder data rate, to be transmitted to a second subscriber unit, into a third time interval which is part of another channel, said third time interval lying between said first and second time intervals, whereby said equal duration time intervals in a given frame, with interleaved bits from different information packets, include bits from information packets of differing coder data rates.

6. A time-division multiplex information transmission system for data having a variable structure, for transmitting information packets from selected ones of a first plurality of subscriber units to corresponding selected ones of a second plurality of subscriber units via a communications arrangement, said corresponding selected ones including units having mutually different coder data rates and packet structures, and each said selected one having respectively the same coder data rate and packet structure as said corresponding selected one, characterized in that said communications arrangement comprises a time division multiplex circuit for multiplexing information signals and forming transmission packets for transmission as part of a multiframe including a plurality of frames, each frame including a plurality of equal duration time intervals forming a selected plurality of channels, each channel corresponding to a respective selected one of said first plurality of subscriber units, said multiplex circuit includes interleaving means for inserting bits of different information packets having a first coder data rate, to be transmitted to a first subscriber unit, into a first time interval which is part of one channel, other bits of said different information packets being inserted into at least a second time interval forming part of said one channel; and for inserting bits of other different information packets having a second coder data rate different from said first coder data rate, to be transmitted to a second subscriber unit, into a third time interval which is part of another channel, said third time interval lying between said first and second time intervals, and said interleaving means transforms $m_2$ different information packets constituted by $m_1$ sub-packets of said information signals having a first coder data rate into $m_1$ transmission packets constituted by bits of each successive sub-packet of information signals, two successive bits of a same information packet being interspaced by $m_2$ bits in the transmission packets, whereby said equal duration time intervals in a given frame, with interleaved bits from different information packets, include bits from information packets of differing coder data rates.

* * * * *